July 31, 1956   D. E. EMRICK   2,756,861
COMPOSITE PLATEN AND METHOD OF MAKING SAME
Filed July 25, 1951

INVENTOR
*DONALD E. EMRICK*
BY *Tom Walker*
ATTORNEY

United States Patent Office 2,756,861
Patented July 31, 1956

2,756,861

COMPOSITE PLATEN AND METHOD OF MAKING SAME

Donald E. Emrick, Germantown, Ohio, assignor to The Standard Register Company, Dayton, Ohio, a corporation of Ohio Application July 25, 1951, Serial No. 238,458

10 Claims. (Cl. 197—144)

This invention relates to a composite article and method of making same, and has particular reference to the construction of platens for recording machines wherein a hard metal core is overlaid by a covering of rubber or rubber-like material.

Such platens contemplate the bonding of the outer rubber covering to the inner core. In the process thereof it has heretofore frequently occurred that pockets of air or gas, termed "blisters" are trapped between the rubber covering and the core. These blisters produce soft spots on the surface of the platen which allow unequal travel of the type bars, resulting in smeared and uneven printing, particularly on underlying copies of manifold record material.

The object of the invention is to improve the construction as well as the mode of operation of platens whereby they may not only be economically manufactured, but will be more efficient and satisfactory in use, uniform in operation, and be unlikely to get out of repair.

Avoidance of the forming of these air or gas pockets in the construction of recording machine platens is an object of this invention.

Another object of the invention is to provide for the fabrication of platens free of soft spots or blisters to thereby assure legible, neat and uniform printing.

A further object of the invention is to modify the method of manufacture of recording machine platens whereby air masses, heretofore trapped during the bonding process may escape to reservoirs in the metal core or to atmosphere, or both.

A further object is to provide a platen possessing the advantageous structural features and inherent meritorious characteristics and method of assembly herein described, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In the accompanying drawing, wherein is illustrated the preferred but obviously not necessarily the only form of embodiment thereof, Fig. 1 is a view in front elevation of a recording machine platen of a class to which the instant invention may be applied;

Like parts are indicated by similar characters of reference throughout the several views.

Figure 1:
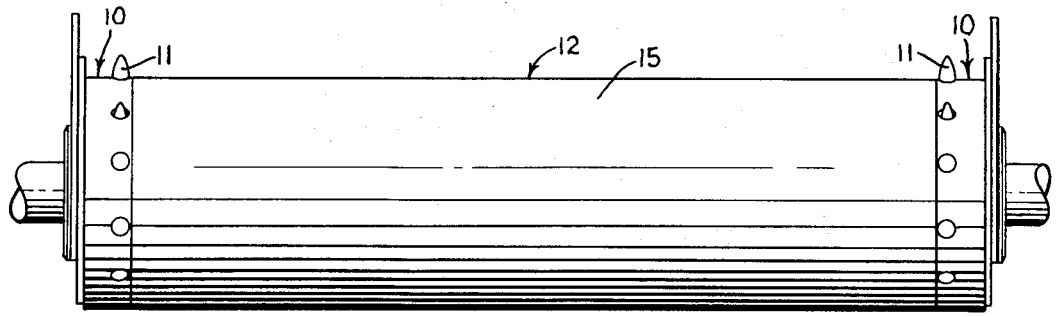

Referring to the drawings, as indicated in Fig. 1 the invention is disclosed as applied in the construction of a typewriter platen, the platen unit of Fig. 1 being one equipped with pin wheel bodies 10 carrying radial pins 11 for engagement with marginal perforations in the record material.

In a platen roll of the class referred to, the platen proper is an assembled device made up of a pair of concavo-convex sections 12 which, when joined in mating relation, define the cylindrical platen roll, with the pin wheel bodies 10 being attached to the ends thereof in a manner not important to the disclosure of the instant invention. The sections 12 are identical. Hence a description of one, and of the method of making thereof, will suffice for both.

Figure 2:
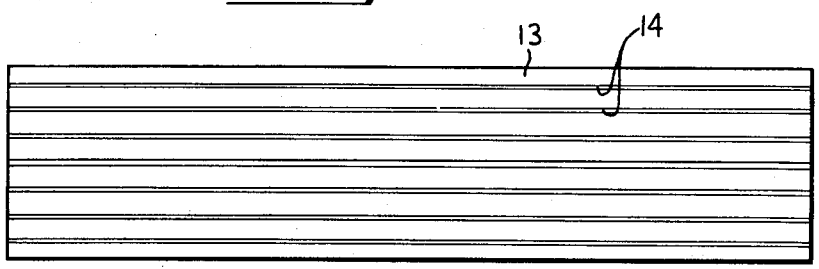
Fig. 2 is a fragmentary view, in front elevation, of a core element of the platen of Fig. 1, showing a surface formation providing for the escape of trapped air.
Figure 3:
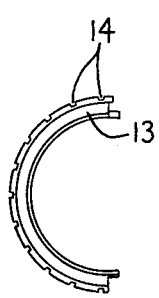
Fig. 3 is a view in end elevation of the core element of Fig. 2.
Figure 4:
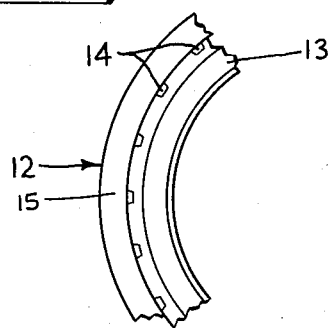
Fig. 4 is a fragmentary view, in end elevation, of a section of the platen of Fig. 1.

Thus, and referring to Figs. 2–4, each section 12 comprises a core or body 13 of a hard, unyielding material, for example, metal. In the convex or outer surface of the body 13 is a series of relatively closely spaced apart longitudinal grooves 14. The grooves 14 extend from end to end of the body, opening through the extremities thereof. They are, moreover, relatively shallow and may assume any convenient shape in cross section. The outer convex surface of the body 13 is overlaid by a sheet 15 of rubber or rubber-like material of relatively soft and resilient character. Among others, a synthetic plastic product known commercially as "Tygon" has been found suitable for use as the sheet or layer 15. The resilient sheet 15 lies in close intimate contact with the body 13, over the entire outer surface thereof. The grooves 14 are covered thereby but remain open throughout their lengths, so that they define in conjunction with the covering 15 longitudinal channels through the platen roll located between the body or core and the overlying layer of resilient material.

According to one possible method of fabricating the section 12, the core or body is machined or suitably cast to the formation shown. A first adhesive then is applied to the metal core and baked thereon. A second adhesive is applied to the resilient material 15 and baked thereon, and a third adhesive is applied to both the metal core and the resilient material and baked. After baking, the resilient material 15 is laid upon the convex surface of the metal core and temporarily held in place thereon, as by wrapping with wet tape. After assembly, the platen section is baked, with the result, as will be understood, that the metal core and overlying layer of resilient material are bonded one to another.

During the wrapping and bonding operations air or gas pockets, which tend to form beneath the layer of resilient material 15, are avoided by reason of the grooves or passages 14 which function alternatively or at one and the same time as reservoirs within the metal core where trapped air may collect or as escape paths along which such trapped air may pass out of the assembly. Assuming a slight flow of the "Tygon" material or of the thermoplastic substances in the adhesives, or both, the longitudinal edges of the grooves 14 may serve as anchors, aiding the bond in preventing detachment of the outer resilient layer 15 from the metal core 13.

Figure 5:
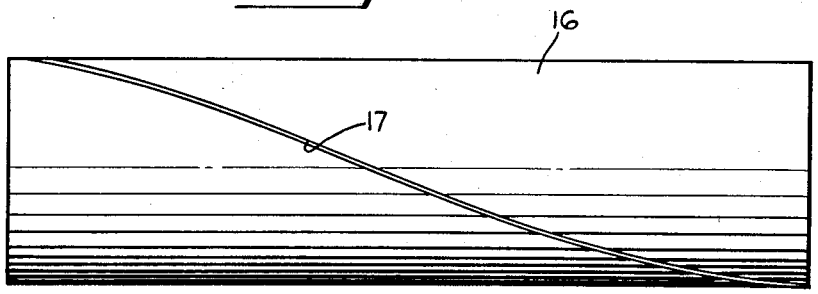
Fig. 5 is a view similar to Fig. 2, showing a modified surface formation.

It will be apparent that the reservoir or escape path defined by the grooves 14 may be achieved by surface formations other than the one illustrated in Figs. 2–4. For example, and as shown in Fig. 5, instead of parallel longitudinal grooves, a metal core 16 may have a continuous helical groove 17, which of course may be reproduced in parallel if desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A platen, including a hard surfaced body portion, a layer of relatively soft resilient material in overlying bonded relation to the surface of said body portion, and an unfilled grooved formation in the surface of said body portion precluding the entrapment of gas pockets between said surface and said overlying layer of resilient material, the grooves of said grooved formation being narrow in relation to the intervening surface area of said body portion and sufficiently deep to obviate filling by said material, said grooves extending beyond the ends of said layer of material.

2. A platen, including a hard surfaced body portion, a layer of relatively soft resilient material in overlying bonded relation to the surface of said body portion, and unfilled air conducting and storing means recessed in the surface of said body portion precluding the entrapment of air pockets between said surface and said overlying layer of resilient material, the area of said means being small in relation to the area of the surface of said body portion which is in contact with said resilient material and said means being sufficiently deep to obviate filling by said material, said means extending beyond the ends of said layer of material.

3. A platen, including a body presenting opposed side edges, a layer of relatively soft resilient material in intimately covering bonded relation to said body, and unfilled groove means in the surface of said body for storing and conducting to the side edges of said body air tending to become trapped between said body and said layer of resilient material during the bonding process, the area of said groove means being small in relation to the surface area of said body which is in contact with said resilient material and said groove means being sufficiently deep to obviate filling by said material, said groove means extending beyond the ends of said layer of material.

4. A platen according to claim 3, characterized in that said groove means comprises a series of parallel longitudinal grooves in said body extending from side to side thereof.

5. A platen according to claim 3, characterized in that said groove means includes one or more helical grooves in said body extending from end to end thereof.

6. A method of making a typewriter or like platen, including the steps of forming a hard core or body with one or more unfilled relatively narrow surface grooves extending from end to end thereof and through the ends of said body, and bonding to the surface of said body a layer of relatively soft resilient material without causing substantial flow of said material into said grooves whereby said grooves may serve as reservoirs or escape conduits for air tending to become trapped between the body and said layer of resilient material during the bonding process.

7. A method of making a typewriter or like platen, including the steps of forming a hard core or body, providing in the surface of said body an unfilled groove formation extending between and through the opposite ends of the body and occupying a relatively small part of the surface area of said body, intimately covering said body with a layer of relatively soft resilient material, and bonding said layer of material to the surface of said body without causing substantial flow of the material into said groove formation whereby said groove formation may serve as a reservoir or escape route for air tending to become trapped between the body and said layer of resilient material during the bonding process.

8. A method of making a typewriter or like platen of the kind made up of mating arcuate sections, including the steps of forming body sections of a hard unyielding substance, providing in the outer curved surface of each of said body sections an unfilled groove formation extending between and through the opposite ends thereof, placing in intimate covering relation to the said outer curved surface of each body section a layer of relatively soft resilient material, holding said layer of material on said body section while bonding said material thereto, said groove formation serving as a reservoir or escape route for air tending to become trapped between the body section and said layer of material, and assembling the sections so fabricated into a platen form.

9. A method of making a typewriter or like platen, including the steps of forming a metal core, providing in the surface of said core a groove formation occupying a relatively small part of the surface of said core and extending through the ends thereof, and bonding a layer of soft resilient material to the surface of said core, said groove formation serving as a reservoir or escape route for air tending to become trapped between the body and said layer of material.

10. A method according to claim 9, characterized in that said platen is made up of a plurality of separable arcuate sections, each of said sections being individually grooved and overlaid with said resilient material and complementing one another to define the platen.

References Cited in the file of this patent

UNITED STATES PATENTS

| 657,121 | Laganke | Sept. 4, 1900 |
|---|---|---|
| 867,045 | Jackson | Sept. 24, 1907 |
| 2,031,872 | Wightman | Feb. 25, 1936 |
| 2,067,211 | Sherman et al. | Jan. 12, 1937 |
| 2,353,194 | Sherman et al. | July 11, 1944 |

FOREIGN PATENTS

| 568,860 | Great Britain | Apr. 24, 1945 |